(12) United States Patent
Shin et al.

(10) Patent No.: US 8,156,567 B2
(45) Date of Patent: Apr. 10, 2012

(54) SOFTWARE INSTALLATION SYSTEM AND METHOD FOR COPY PROTECTION

(75) Inventors: Dong Ryeol Shin, Gunpo-si (KR); Kee Hyun Choi, Suwon-si (KR); Ho Jin Shin, Suwon-si (KR)

(73) Assignee: Sungkyunkwan University, Jangan-Gu, Suwon-Si, Gyeonggi-Do (KR)

( * ) Notice: Subject to any disclaimer, the term of this patent is extended or adjusted under 35 U.S.C. 154(b) by 1076 days.

(21) Appl. No.: 12/022,944

(22) Filed: Jan. 30, 2008

(65) Prior Publication Data

US 2009/0077674 A1 Mar. 19, 2009

(51) Int. Cl.
 *G06F 7/04* (2006.01)
(52) U.S. Cl. .......................................... 726/31
(58) Field of Classification Search .................. None
See application file for complete search history.

(56) References Cited

FOREIGN PATENT DOCUMENTS

| JP | 2001-216357 | | 8/2001 |
|----|------------|---|--------|
| KR | 2002-51612 | | 6/2002 |
| KR | 2006/086724 A | * | 8/2006 |

OTHER PUBLICATIONS

Keunwoo Rhee, Jin Kwak, Wan Yi, Chanho Park, Sangjoon Park, Hyungkyu Yang, Seungjoo Kim and Dongho Won, "Efficient RFID Authentication Protocol for Minimizing RFID Tag Computation," ICHIT 2006, LNAI 4413, pp. 607-616, 2007.*

* cited by examiner

Primary Examiner — Kaveh Abrishamkar
(74) Attorney, Agent, or Firm — Lexyoume IP Group, PLLC.

(57) ABSTRACT

The present invention relates to a software installation system and a method for copy protection. The software installation system includes a support server in which first installation data for installing software is stored; a recording medium in which an RFID tag storing URL information of the support server is installed and second installation data for installing the software is recorded; a computer having a computer interface unit and a data reading unit reading the second installation data recorded in the recording medium; an RFID reader for reading the RFID tag installed in the recording medium; a portable information processing terminal including a wireless communication unit accessing the support server through wireless Internet, a terminal interface unit connected to the computer interface unit of the computer, and a terminal controller downloading the first installation data and controlling the computer through the terminal interface unit and the computer interface unit.

13 Claims, 6 Drawing Sheets

SOFTWARE INSTALLATION SYSTEM AND METHOD FOR COPY PROTECTION

Claiming Foreign Priority

The applicant claims and requests a foreign priority, through the Paris Convention for the Protection of Industrial Priority, based on patent applications filed in the republic of Korea (South Korea) with the filling date of Sep. 19, 2007 with the patent application Ser. No. 10-2007-0095091 by the applicant, the contents of which are incorporated by reference into this disclosure as if fully set forth herein.

BACKGROUND OF THE INVENTION

1. Field of the Invention

The present invention relates to a software installation system and a method for copy protection; more particularly, to a software installation system and a method capable of preventing illegal distribution of software by using portable information processing terminals such as a mobile phone and an RFID tag to prevent software distributed with being recorded in a recording medium such as an optical disk from being copied.

2. Background of the Related Art

Korea Software Property-right Council announced that a financial damage caused due to illegal software usage has amounted to approximately 30 billion won only in Korea and a total financial damage including a financial damage caused due to illegal usage of software developed overseas has amounted to 29 billion dollar in 2004.

A corporate damage caused due to distribution of illegal software is several times more than a normal sale profit. Although the illegal software is used by businesses as well as individuals, it is difficult to prevent the individuals from using the illegal software rather than the businesses.

Since the individuals illegally distribute on Internet such as P2P (Peer To Peer), Warez and Web Hard without the consent of a copyright company, it is difficult to expose the individuals' illegal software usages and to find out an individual who firstly spread the illegal software. Since an original file name is changed at the time of distributing the software, it is difficult to prevent the distribution of the illegally copied software at first.

Easiness of the copy, which is a characteristic of the software, inversely functions as a potential and fatal disadvantage included in the software. Accordingly, various arts for protecting the software from the illegal software copying have been proposed and widely used methods include a method of authenticating qualifying software in on-line area and a method of inputting a CD-key or a serial number in off-line area.

As described above, one example of an art of authenticating the qualifying software on-line is disclosed in Korean Patent Registration No. 0602107 (registered on Jul. 10, 2006, entitled "SYSTEM AND METHOD FOR MANAGING SOFT COPYRIGHT OF NETWORK ENVIRONMENT").

The art disclosed in Korean Patent Registration No. 0602107 is constituted of a client PC in which specific software is installed and a license server authenticating the software by receiving user information from the client PC through a network. Korean Patent Registration No. 0602107 discloses that the license server is constituted of a communication module for transmit and receiving data to and from the client PC, a product registration module for registering a product by receiving a product serial number, product registration DB in which the product serial number is stored, a use authentication module for determining whether a user is an authorized user or not and use authentication DB in which an authorized user authentication log is stored.

That is, the art disclosed in Korean Patent Registration No. 0602107, a user accesses the license server through the network to obtain a license of using the software of the client PC and the license server determines whether the use of the software is legal or not by stepwise comparisons such as the product serial number of the software, collision occurred or not, execution occurred or not, the comparison of an IP (Information Provider) address and the inquiry of a legal user, and transmits the approval or disapproval to the client PC so as to protect the copyright of the software by preventing the illegal use of the software in a copyright management system and a method thereof.

One example of an art of authenticating the software by the use of a CD-Key is disclosed in Korean Patent Publication No. 2005-0052980 (published on Jun. 7, 2005, an electronic creation method of a serial number containing an identifier of software, contents or electronic information, an issuing method of a coupon printed with the serial number, an authentication method using the serial number and a computer-readable recording medium in which a program for performing these methods are recorded are disclosed in this patent gazette).

The art disclosed in Korean Patent Publication No. 2005-0052980 relates to a method of performing the certification of the authenticity by creating the serial number to certify the authenticity of the software, and more particularly, discloses that the authenticity certifying method includes the steps of receiving a created final serial number, decoding the inputted serial number, extracting variables and a solution of a specific function expression from the decoded serial number, checking whether the extracted variables and the solution of the specific function expression satisfy a specific function expression previously defined between a serial number creating server and an authentication server or not, and confirming whether the extracted variables contain an identifier of the software, contents or the electronic information or not.

In the art disclosed in Korean Patent Publication No. 2005-0052980, there are disclosed a method of electronically creating a serial number including identifiers of software, contents, or electronic information capable of saving an unnecessary fee and firming up the protection of a privacy and a business secret of a content provider, a method of issuing a coupon printed with the serial number, an authentication method by the serial number, and a computer-readable recording medium in which a program for performing the methods is recorded since the authentication is smoothly performed although a issuer server and a content provider server are not communicated with each other on-line, the art is not influenced by a non-settlement situation caused by a network error occurring in the related art or a serial number leakage situation caused by hacking and the intervening of an interim account settlement server is not required.

SUMMARY OF THE INVENTION

Technical Problem

However, in the arts disclosed in the patent gazettes, it was still impossible to cope with illegal usage of software due to avoidance of on-line authentication or sharing of a CD key. That is, other users could easily use the software due to a user's intervening in the authentication of the software or making information required for decryption or the CD key public.

In case of hardware, all products provided the same function, but in case that the products were not physically possessed, the products' own functions could not be used, while in case of software, there was a problem that a copied product could be used in the same manner as an original product without a difference in function when the original product was copied and distributed. For example, the user could illegally copy or distribute the software in a known installation method using a CD-ROM (Compact Disc Read-only Memory).

Accordingly, it is, therefore, an object of the present invention to provide a software installation system and a method thereof capable of disabling the software to be installed only by copying the software by dividing and distributing data required to install the software in a physically divided devices, by carrying out an authentication process by the use of an RFID tag which is difficult to copy, and by carrying out the authentication process not by a computer which the software is installed but by a portable information processing terminal.

It is another object of the present invention to provide a software installation system and a method thereof capable of preventing the software from being copied by operating a part of the data of the software used at the time of installing the software and an authentication key used at the time of authenticating the software in the portable information processing terminal rather than the computer so the data required to copy the software is not stored in the computer.

Technical Solution

In order to achieve the above-mentioned object, in accordance with an aspect of the present invention, there is a software installation system including a support server in which first installation data for installing software is stored; a recording medium in which an RFID tag storing URL information of the support server is installed and second installation data for installing the software is recorded; a computer having a computer interface unit and a data reading unit reading the second installation data recorded in the recording medium; an RFID reader for reading the RFID tag installed in the recording medium; a portable information processing terminal including a wireless communication unit accessing the support server through wireless Internet, a terminal interface unit connected to the computer interface unit of the computer, and a terminal controller downloading the first installation data by accessing the support server through the wireless communication unit according to the URL information read by the RFID reader and controlling the computer through the terminal interface unit and the computer interface unit so as to install the software in the computer by the use of the downloaded first installation data and the second installation data read by the computer.

Herein, wherein an authentication key may be stored in the RFID tag, the terminal controller of the portable information processing terminal may transmit the authentication key to the support server through the wireless communication unit, and the support server may transmit the first installation data when the support server succeeds in authentication by the use of the authentication key.

The authentication key may be stored in the RFID tag, and the terminal controller may download an authentication program required for the authentication from the support server and may download the first installation data when the authentication key is determined to be available by the downloaded authentication program.

The RFID reader serves as one function of the portable information processing terminal with being incorporated in the portable information processing terminal.

The RFID reader and the portable information processing terminal may be physically separated from each other, the RFID reader may include an RFID reading unit reading the RFID tag, a first RFID interface unit connected to the computer interface unit, and a second RFID interface unit connected to the terminal interface unit, the URL information and the authentication key read by the RFID reader may be transmitted to the portable information processing terminal through the second RFID interface unit, and the computer interface unit and the terminal interface unit may be interconnected to each other through the first RFID interface unit and the second RFID interface unit.

The computer may include a synchronization program which is synchronized with the terminal controller of the portable information processing terminal and supports the installation of the software according to the control of the terminal controller.

The second installation data may be basic data including at least any one of a data file, a text file, a configuration file, an image file, and an information file, and the first installation data may be execution data for executing the basic data so as to install the software.

The portable information processing terminal may include any one of a mobile phone and a PDA (Personal Digital Assistant).

The recording medium may include any one of a CD-ROM and a DVD-ROM, and the data reading unit of the computer may include a CD-ROM drive or a DVD-ROM drive.

The computer interface unit and the terminal interface unit may be interconnected to each other through a USB (Universal Serial Bus) system.

Meanwhile, in order to achieve the above-mentioned object, in accordance with another aspect of the present invention, there is a method of installing software for copy protection using an RFID reader and a portable information processing terminal including the steps of: storing first installation data for installing the software in a support server, installing an RFID tag storing URL information of the support server and preparing a recording medium in which second installation data for installing the software is recorded; reading the RFID tag installed in the recording medium through the RFID reader; reading the second installation data recorded in the recording medium by a computer in which the software will be installed; accessing the support server through wireless Internet by the information processing terminal according to the URL information read through the RFID reader and downloading the first installation data; and controlling the computer by the portable information processing terminal so as to install the software in the computer by the use of the downloaded first installation data and the read second installation data with the portable information processing terminal and the computer connected to each other.

Herein, the method of installing the software further includes the steps of storing an authentication key in the RFID tag and transmitting the authentication key read by the RFID reader to the support server from the portable information processing terminal through wireless Internet, wherein the first installation data may be downloaded from the support server in case that authentication is succeeded for the authentication key transmitted from the portable information processing terminal.

DETAILED DESCRIPTION OF THE INVENTION

Hereinafter, preferred embodiments of the present invention will be described in more detail with reference to the accompanying drawings.

Figure 1:
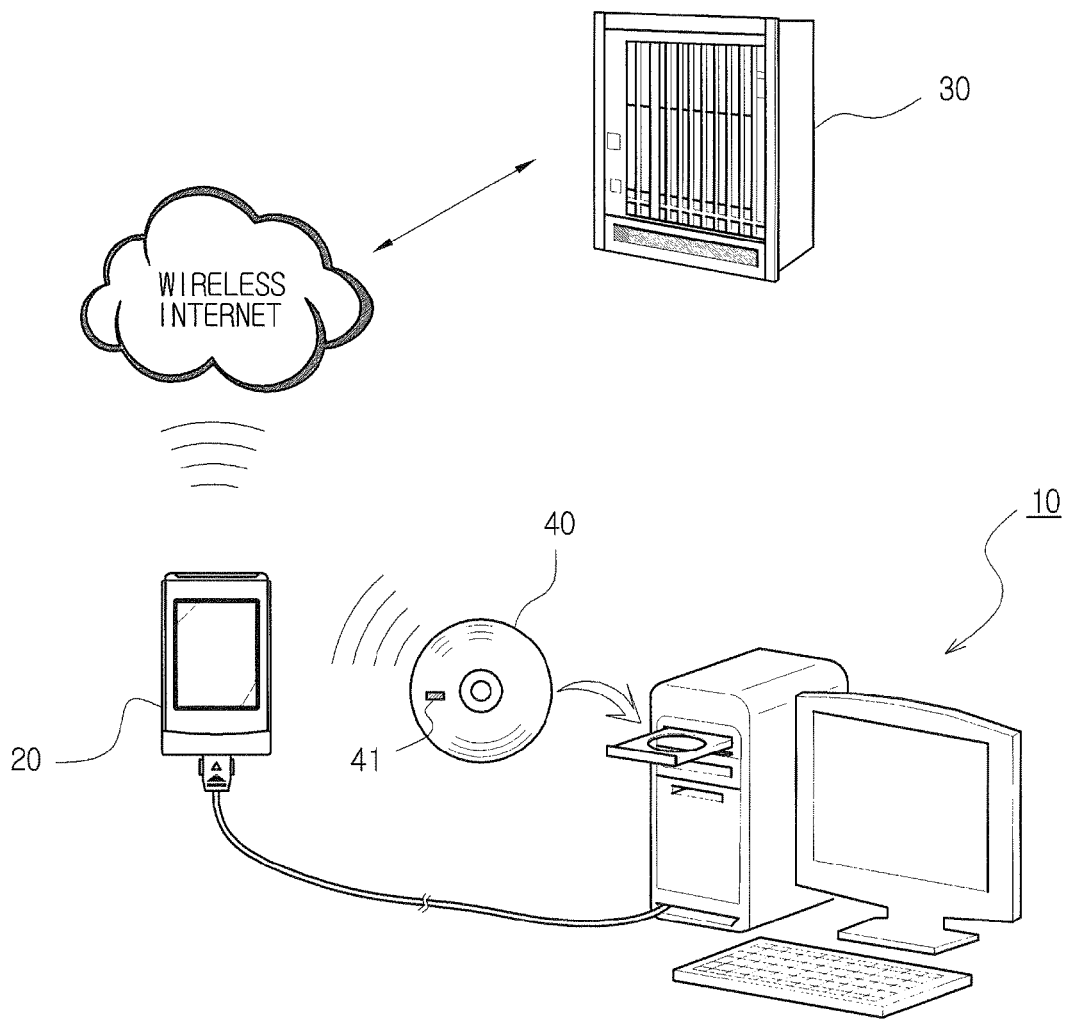
FIG. 1 is a diagram showing a configuration of a software installation system in accordance with a first embodiment of the present invention.

FIG. 1 is a diagram showing a configuration of a software installation system in accordance with a first embodiment of the present invention. As shown in the figure, the software installation system in accordance with the first embodiment of the present invention includes a support server 30, a recording medium 40, a computer 10, an RFID reader 50, and a portable information processing terminal 20.

The support server 30 stores first installation data for installing the software. Herein, the software in accordance with the present invention is installed in the computer 10, and the installation data required to install the software is divided into the first installation data and second installation data and distributed. The first installation data is stored in the support server 30 and the second installation data is distributed with being recorded in the recording medium 40. The support server 30 and distributed by a method to be described later may be a server managed by a company which develops and sells the software.

The second installation data for installing the software is recorded in the recording medium 40. Herein, the recording medium 40 in accordance with the present invention may be prepared in the form of an optical disk such as such as a CD-ROM or a DVD-ROM and may be prepared in another form distributable through user's purchase, for example, in the form of a memory card.

As shown in FIG. 1, an RFID tag 41 is attached to the recording medium 40. Herein, URL (Uniform Resource Locator) information of the support server 30 storing the first installation data is stored in the RFID tag 41.

Figure 2:
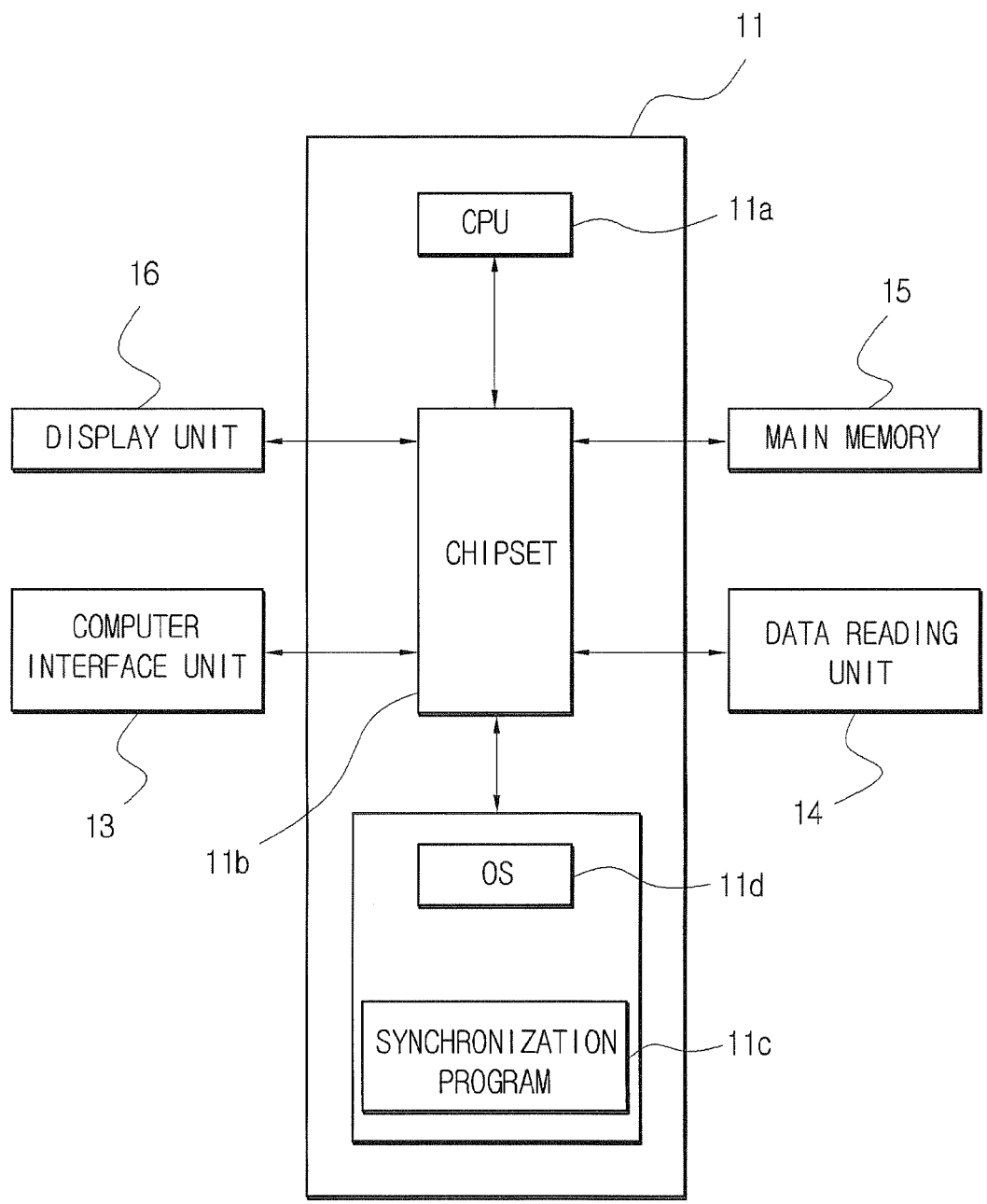
FIG. 2 is a diagram showing one example of a configuration of a computer of the software installation system of FIG. 1.

Meanwhile, as shown in FIG. 2, the computer 10 as a target computer in which the software is installed in the software installation system in accordance with the present invention may include a computer interface unit 13 and a data reader unit 14.

The computer interface unit 13 is connected to an terminal interface unit 23 to be described later of the portable information processing terminal 20, and interfaces data exchange between the portable information processing terminal 20 and the computer 10. Herein, in accordance with the present invention, the embodiment that the computer interface unit 13 and the terminal interface unit 23 are interconnected to each other through a USB (Universal Serial Bus) system is described as one example. An interface system of another form capable of exchanging the data, for example, an IEEE 1394 interface system may be applied.

The data reader unit 14 reads the second installation data recorded in the recording medium 40 when the recording medium 40 is connected to the computer 10. Herein, in case that the recording medium 40 in accordance with the present invention has a disk form, the data reader unit 14 may be prepared in the form of an optical disk drive such as the CD-ROM drive or the DVD-ROM drive as shown in FIG. 2.

Referring to FIG. 2, more specifically to describe the computer 10 in accordance with the present invention, the computer in accordance with the present invention may include the above-mentioned computer interface unit 13, the data reader unit 14, a main memory 15, a display unit 16, and a computer controller 11.

The main memory 15 operates as a main memory device of the computer 10 and is prepared in the form of a RAM (Random Access Memory). Data, programs and the like required for operation of the computer controller 11 are temporarily stored in the main memory 15.

The computer controller 11 performs arithmetic and controlling operations which are original functions of the computer 10 in accordance with the present invention. The computer 10 may include a CPU (Central Processing Unit) 11$a$, a chipset 11$b$ for relaying the data exchange between the CPU 11$a$ and other components, and a hard disk drive which is an auxiliary memory device in which an OS (Operating System) 11$d$, application programs, data and the like are stored.

Herein, the computer controller 11 in accordance with the present invention may include a synchronization program 12 for supporting the installation of the software according to the data exchange with the portable information processing terminal 20 connected through the computer interface unit 13 and the control of a portable information processing device. The synchronization program 12 is installed in the computer 10 and is stored in the hard disk drive.

Herein, the synchronization program 12 installed and stored in the computer 10 may be distributed to users with being included in the second installation data recorded in the recording medium 40 and may be installed and stored in the computer 10 at the time of inserting the recording medium 40, for example, the optical disk in an optical disk drive of the computer 10.

The synchronization program 12 recorded in the recording medium 40 may include a compression/decryption program required for decompression in case that the second installation data required for installing the software is distributed in a compressed form.

Meanwhile, the RFID reader 50 reads the RFID tag 41 installed in the recording medium 40 and transfers information stored in the read RFID tag 41 to the portable information processing terminal 20. Herein, in the software installation program in accordance with the first embodiment of the present invention, the embodiment that the RFID reader 50 is incorporated in the portable information processing terminal 20, that is, the RFID reading function serves as one function of the portable information processing terminal 20 is described as one example.

Figure 3:
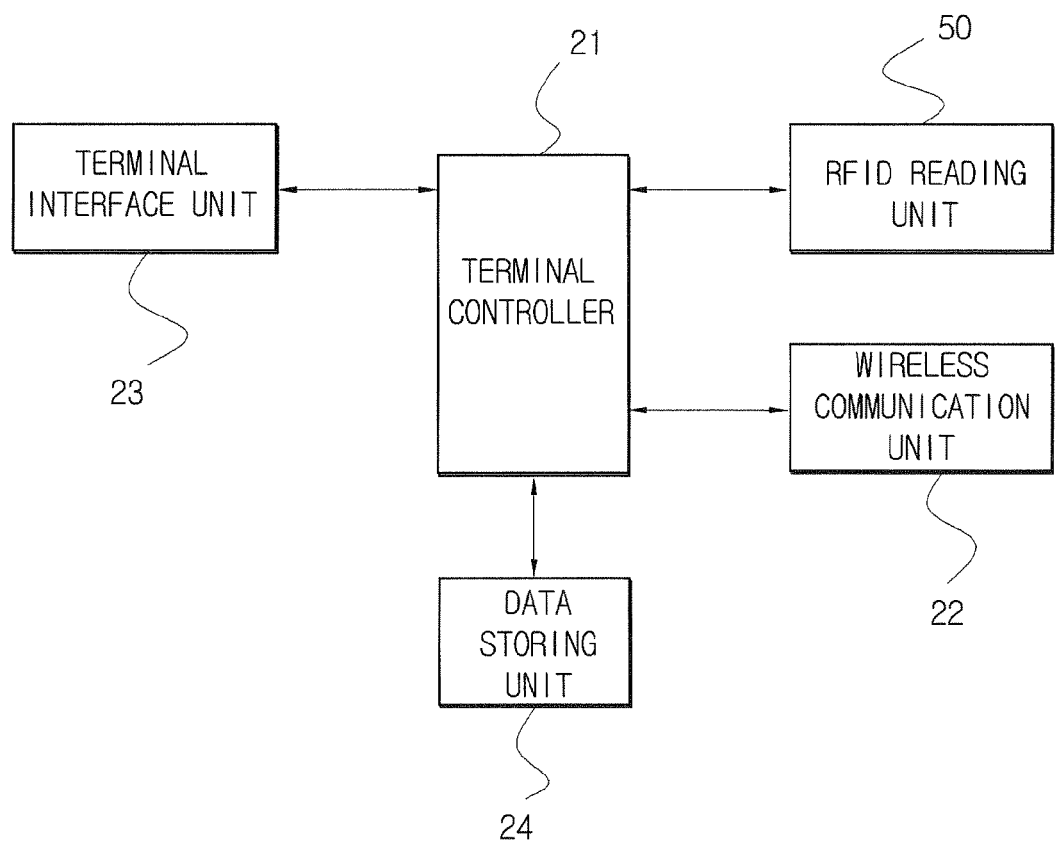
FIG. 3 is a diagram showing one example of one example of a portable information processing terminal of the software installation system of FIG. 1.

Hereinafter, the portable information processing terminal 20 in accordance with the first embodiment of the present invention will be described with reference to FIG. 3. As shown in FIG. 3, the portable information processing terminal 20 in accordance with the first embodiment of the present invention may include a wireless communication unit 22, the terminal interface unit 23 and a terminal controller 21. The portable information processing terminal 20 may include a data storage unit 24 in which various data including the first installation data downloaded from the support server 30.

The wireless communication unit 22 is connected to wireless Internet and is connected to the support server 30 through the wireless Internet. As described above, the terminal interface unit 23 is connected to the computer interface unit 13 of the computer 10. In the present invention, an embodiment using the USB system is described as one example.

The terminal controller 21 is connected to the support server 30 through the wireless communication unit 22 on the basis of the URL information read through the RFID reader 50 and downloads the first installation data stored in the support server 30. The terminal controller 21 controls the computer 10 so as to install the software in the computer 10 by the use of the first installation data downloaded through the wireless communication unit 22.

More specifically, in a state that the computer can read the second installation data from the recording medium 40, for example, the optical disk having the second installation data is inserted in the optical disk drive of the computer 10, the terminal controller 21 downloads the first installation data, and controls the computer 10 through the terminal interface unit 13 and the computer interface unit 13 so that the software is installed in the computer 10 while the computer 10 reads the second installation data from the recording medium 40. At this time, the terminal controller 21 performs installation of the software in the computer 10 in conjunction with the synchronization program 12 installed in the computer 10.

Herein, the second installation data for installing the software may be constituted of basic data required to install the software, such as a data file, a text file, a configuration file, an image file and an information file. The first installation data may be prepared in the form of execution data for driving the basic data.

That is, as described above, the terminal controller 21 of the portable information processing terminal 20 downloads and executes the first installation data, that is, the execution data from the support server 30 in a state that the optical disk is inserted in the computer 10, and the synchronization program 12 is installed and executed.

At this time, the first installation data which is the execution data required to install the software is executed within the portable information processing terminal 20. The terminal controller 21 transmits a command required to install the software to the synchronization program 12 of the computer 10 through the terminal interface unit 23 and the computer interface unit 13 by the execution of the execution data. The synchronization program 12 executes the installation of the software by reading the second installation data from the optical disk according to the command transmitted from the portable information processing terminal 20.

Accordingly, the portable information processing terminal 20 can prevent a part of the data required to install the software, that is, the first installation data from being stored in the computer 10 by downloading the execution data from the support server 30 and transferring the command required to install the software to the synchronization program 12 installed in the computer 10 while the execution data executed within the portable information processing terminal 20 without transmitting the execution data to the computer 10. Therefore, it is possible to prevent the software from being illegally copied by keeping all data required to install the software from being stored in the computer 10 from which the data can be easily read or accessed.

Herein, the portable information processing terminal 20 in accordance with the present invention may be prepared in wireless Internet available form such as a mobile phone or a PDA (Personal Digital Assistant) and may be prepared in various portable terminal forms regardless of their names.

In the portable information processing terminal 20 in accordance with the present invention, a function of the terminal controller 21 for installing the software may be prepared in the portable information processing terminal 20 as a program form of an ontology form. That is, since installing the program for installing the software in the portable information processing terminal 20 at the time of installing various kinds of software in the computer 10 is inefficient in consideration of a storage capacity of the portable information processing terminal 20, a standardized program defining information required to install the software as ontology is installed and more information required to install the software is provided from the support server 30 in a file format such as an XML at the time of downloading the first installation data to install the software on the basis of the first installation data.

Meanwhile, authentication keys can further be stored in the RFID tag 41 of the software installation system in accordance with the first embodiment of the present invention. The terminal controller 21 of the portable information processing terminal 20 transmits the authentication key read by the RFID reader 50 to the support server 30 through the wireless communication unit 22. At this time, the support server 30 authenticates whether the corresponding software is authentic or not based on the authentication key transmitted from the portable information processing terminal 20 and in case that the corresponding software is authenticity, the first installation data can be transmitted to the portable information processing terminal 20.

Herein, the terminal controller 21 of the portable information processing terminal 20 can access the support server 30 and download an authentication program required for authentication on the basis of the URL information read by the RFID reader 50. The terminal controller 21 checks availability of the authentication key read by the RFID reader 50 by executing the downloaded authentication program to determine the authentication or failure in authentication.

Figure 4:
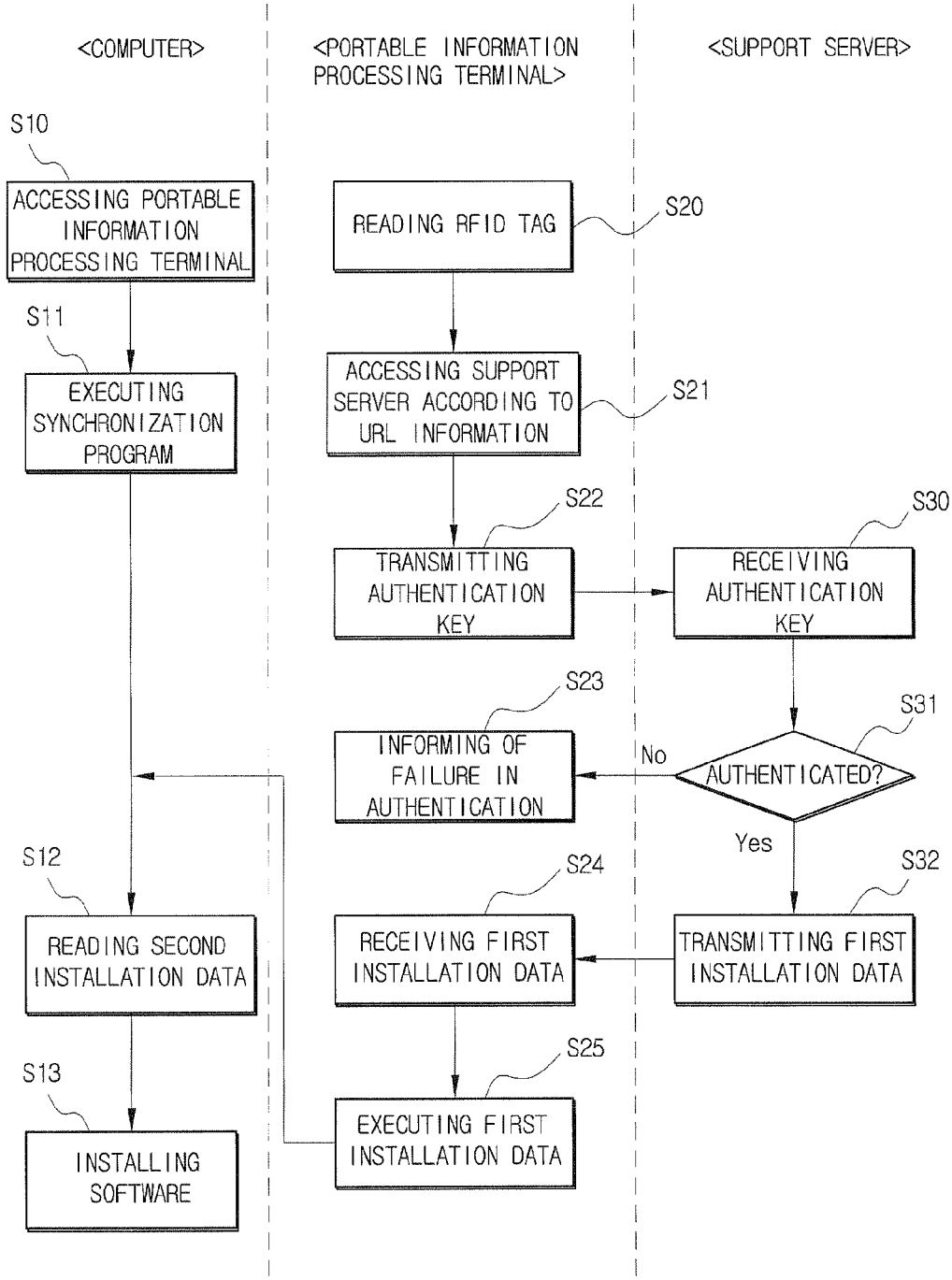
FIG. 4 is a diagram illustrating a method of installing software through the software installation system in accordance with the first embodiment of the present invention.

According to the above-mentioned configuration, a process of installing the software in the computer 10 by the use of the software installation system in accordance with the first embodiment of the present invention will be described with reference to FIG. 4 as follows.

First, the user purchases the recording medium 40 in which the RFID tag 41 is installed and connects the computer 10 with the portable information processing terminal 20 (S10). At this time, the computer 10 executes the synchronization program 12 by recognizing the access of the portable information processing terminal 20 according to a function of a Plug and Play (S11).

Meanwhile, the user reads the RFID tag 41 installed in the recording medium 40 through the RFID reader 50 of the portable information processing terminal 20 (S20) and the terminal controller 21 of the portable information processing terminal 20 accesses the support server 30 through the wireless communication unit 22 according to the URL information of the support server 30 read from the RFID tag 41 (S21). After then, the terminal controller 21 transmits the authentication key read from the RFID tag 41 to the accessed support server 30 (S22).

Herein, when the authentication key is received from the portable information processing terminal through the wireless Internet (S30), the support server 30 determines the authentication or failure in authentication based on the received authentication key (S31). At this time, when the support server 30 fails in the authentication by the use of the authentication key, the support server 30 reports the failure in the authentication to the portable information processing terminal 20 (S23) and when the support server 30 succeeds in the authentication by the use of the authentication key, the support server 30 transmits the first installation data to the portable information processing terminal 20 through the wireless Internet (S32).

When the terminal controller 21 of the portable information processing terminal 20 receives the first installation data from the support server 30 through the wireless communication unit 22 (S24), the terminal controller 21 of the portable information processing terminal 20 executes the received first installation data (S25).

At this time, the synchronization program 12 of the computer 10 reads the second installation data from the recording medium 40 according to the drive of the first installation data in conjunction with the synchronization program 12 of the computer 10 (S12) and the terminal controller 21 control the synchronization program 12 of the computer 10 so as to install the software according to the drive of the read second installation data and the first installation data (S13).

According to the above-mentioned configuration, the software installation system in accordance with the first embodiment of the present invention can prevent a possibility of installing the software only with copying the recording medium 40 such as the optical disk which the user purchases by distributing the data for the installation of the software with being divided into the first installation data and the second installation data.

The authentication key is recorded in the RFID tag 41 which is difficult to copy, and the user is authenticated by reading the authentication key by the use of the RFID reader 50 incorporated in the portable information processing terminal 20 such as the mobile phone and transmitting the read authentication key to the support server 30 through the wireless Internet, whereby it is possible to intercept the distribution of the authentication key.

It is possible to prevent all data from being recorded in the computer 10 from which the data can be easily copied by installing the software in conjunction between the portable information processing terminal 20 and the computer 10, and by driving the first installation data which the execution data required for the installation of the software in not the computer 10 but the portable information processing terminal 20.

Hereinafter, a software installation system in accordance with a second embodiment of the present invention will be described in detail with reference to FIG. 5. Herein, in describing the second embodiment of the present invention, the same constituent members in the first embodiment are identified by the same reference numerals and a description thereof may be omitted.

Figure 5:
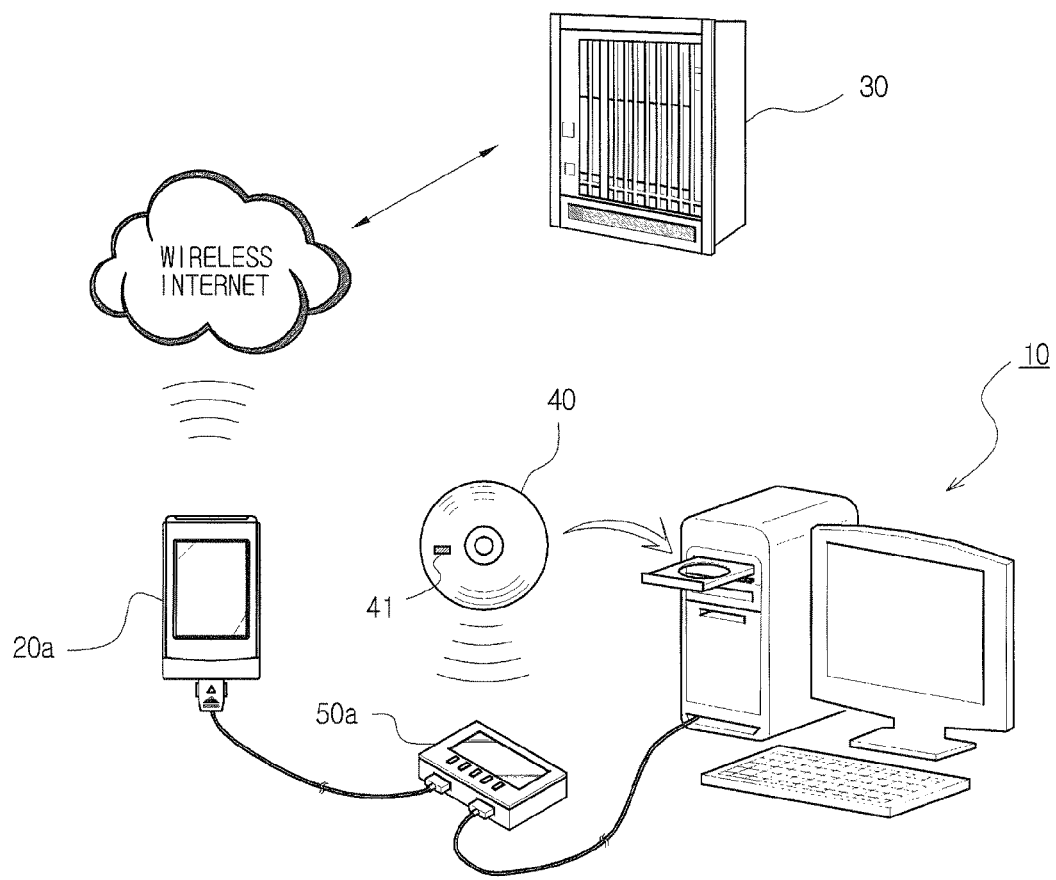
FIG. 5 is a diagram showing a configuration of a software installation system in accordance with a second embodiment of the present invention.

As shown in FIG. 5, an RFID reader 50a of the software installation system in accordance with the second embodiment of the present invention is provided as a device physically separated from a portable information processing terminal 20a.

Figure 6:
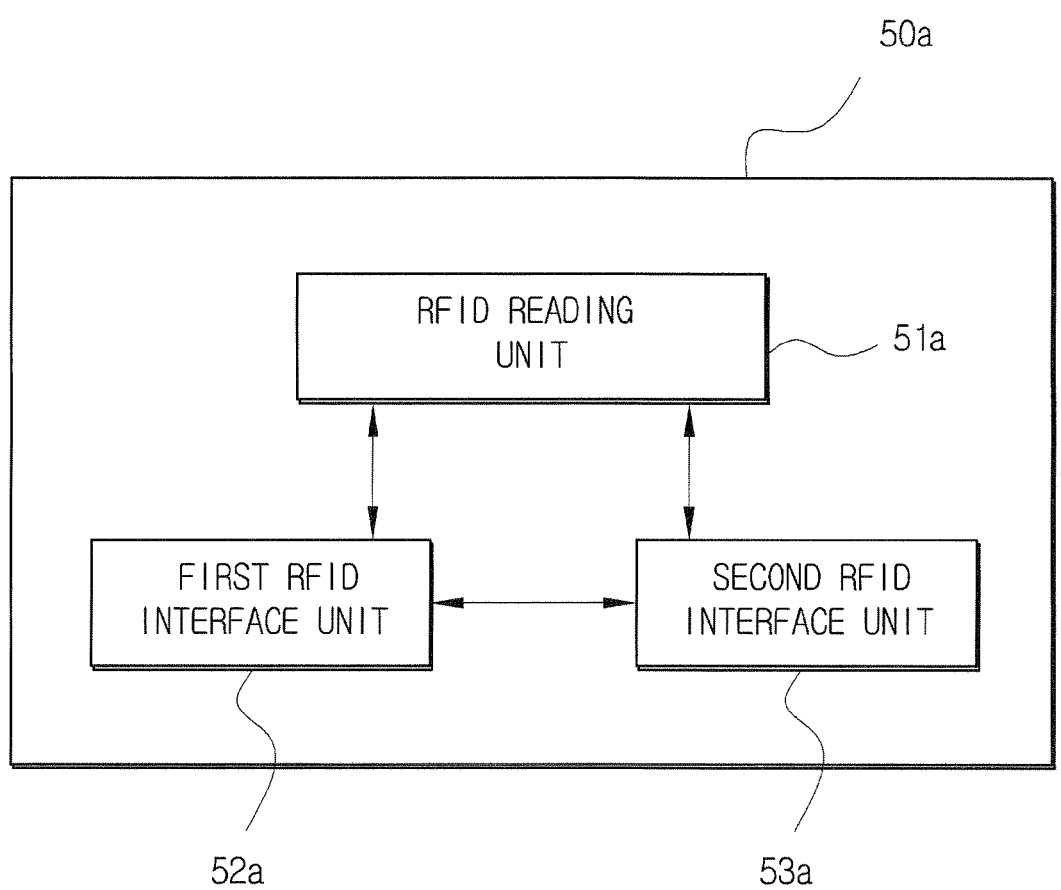
FIG. 6 is a diagram showing one example of a configuration of an RFID reader of the software installation system of FIG. 5.

As shown in FIG. 6, the RFID reader 50a includes an RFID reading unit 51a reading the RFID tag 41, a first RFID interface unit 52a connected to the computer interface unit 13 of the computer 10 and a second RFID interface unit 53a connected to the terminal interface unit 23 of the portable information processing terminal 20a.

Herein, the URL information and the authentication key read through the RFID reading unit 51a of the RFID reader 50a are transmitted to the portable information processing terminal 20a through the second RFID interface unit 53a, and the portable information processing terminal 20a receives the URL information and the authentication key from the RIFD reader 50a through the terminal interface unit 23 connected to the second RFID interface unit 53a.

The computer interface unit 13 of the computer 10 and the terminal interface unit 23 of the portable information processing terminal 20a are interconnected to each other through the first RFID interface unit 52a and the second RFID interface unit 53a of the RFID reader 50a to exchange the data with each other.

According to the above-mentioned configuration, the software installation system in accordance with the second embodiment of the present invention can realize the functions of the software installation system in accordance with the first embodiment of the present invention, and thus the detailed description thereof will be substituted by the description in the first embodiment.

In the above mentioned software installation system in accordance with the present invention, computer is described as one example of the device which software is installed. But another devices for example PDA (Personal Digital Assistants), PMP (Portable Multimedia Player), gaming player and so forth which software can be installed are also available for the software installation system in accordance with present invention.

Software installing system according to the present invention may be provided that authentication is required when the RFID reader reads the RFID tag. Consequently the RFID reader is allowed to read RFID tag only if an authentication key is included in the RFID reader. The RFID reader is not allowed to read the RFID tag in case an authentication key is not included in the RFID reader.

An authentication key can be provided to a user by a qualified software seller when the user purchases software from the qualified software seller. In this case an authentication key can be provided to the user by several way for example storing in the user's portable memory, downloading according to a prescribed procedures from a web site of the qualified software seller or downloading to the user's mobile phone.

Although preferred embodiments of the present invention have been described in detail, the appended claims of the present invention is not limited to the preferred embodiment of the present invention and it will be apparent to those skilled in the art that various changes and modifications may be made without depart from the scope of the present invention as defined in the appended claims.

What is claimed is:

1. A software installation system for copy protection, comprising:
   a support server in which first installation data for installing software is stored;
   a recording medium in which an RFID tag storing URL information of the support server is installed and second installation data for installing the software is recorded;
   a computer having a computer interface unit and a data reading unit reading the second installation data recorded in the recording medium;
   an RFID reader reading the RFID tag installed in the recording medium;
   a portable information processing terminal including a wireless communication unit accessing the support server through wireless Internet, a terminal interface unit connected to the computer interface unit of the computer, and a terminal controller downloading the first installation data by accessing the support server through the wireless communication unit according to the URL information read by the RFID reader and controlling the computer through the terminal interface unit and the computer interface unit so as to install the software in the computer by the use of the downloaded first installation data and the second installation data read by the computer, wherein an authentication key is stored in the RFID tag, the terminal controller of the portable information processing terminal transmits the authentication key to the support server through the wireless communication unit, and the support server transmits the first installation data when the support server succeeds in authentication by the use of the authentication key.

2. The software installation system according to claim 1, wherein the RFID reader serves as one function of the portable information processing terminal with being incorporated in the portable information processing terminal.

3. The software installation system according to claim 1, wherein the RFID reader and the portable information processing terminal are physically separated from each other, wherein the RFID reader includes an RFID reading unit reading the RFID tag, a first RFID interface unit connected to the computer interface unit, and a second RFID interface unit connected to the terminal interface unit, wherein the URL information and the authentication key read by the RFID reader is transmitted to the portable information processing terminal through the second RFID interface unit, and wherein the computer interface unit and the terminal interface unit are interconnected to each other through the first RFID interface unit and the second RFID interface unit.

4. The software installation system according to claim 2, wherein the computer includes a synchronization program which is synchronized with the terminal controller of the portable information processing terminal and supports the installation of the software according to the control of the terminal controller.

5. The software installation system according to claim 2, wherein the second installation data is basic data including at least anyone of a data file, a text file, a configuration file, an image file, and an information file, and wherein the first installation data is execution data for executing the basic data so as to install the software.

6. The software installation system according to claim 2, wherein the portable information processing terminal includes anyone of a mobile phone and a PDA (Personal Digital Assistant).

7. The software installation system according to claim 2, wherein the recording medium includes anyone of a CD-ROM and a DVD-ROM, and the data reading unit of the computer includes a CD-ROM drive or a DVD-ROM drive.

8. The software installation system according to claim 2, wherein the computer interface unit and the terminal interface unit are interconnected to each other through a USB (Universal Serial Bus) system.

9. A method of installing software for copy protection using an RFID reader and a portable information processing terminal, comprising:

storing first installation data for installing the software in a support server;

installing an RFID tag storing URL information of the support server and preparing a recording medium in which second installation data for installing the software is recorded;

reading the RFID tag installed in the recording medium through the RFID reader;

reading the second installation data recorded in the recording medium by a computer in which the software will be installed;

accessing the support server through wireless Internet by the information processing terminal according to the URL information read through the RFID reader and downloading the first installation data;

controlling the computer by the portable information processing terminal so as to install the software in the computer by the use of the downloaded first installation data and the read second installation data with the portable information processing terminal and the computer connected to each other;

storing an authentication key in the RFID tag; and transmitting the authentication key read by the RFID reader to the support server from the portable information processing terminal through wireless Internet, wherein the first installation data is downloaded from the support server in case that authentication is succeeded for the authentication key transmitted from the portable information processing terminal.

10. The method of installing the software according to claim 9, wherein the portable information processing terminal and the computer is interconnected to each other through a USB (Universal Serial Bus) system.

11. The method of installing the software according to claim 9, wherein the second installation data is basic data including at least one of a data file, a text file, a configuration file, an image file, and an information file, and wherein the first installation data is execution data for executing the basic data so as to install the software.

12. The method of installing the software according to claim 9, wherein the portable information processing terminal includes anyone of a mobile phone and a PDA (Personal Digital Assistant).

13. The method of installing the software according to claim 9, wherein the recording medium includes anyone of a CD-ROM and a DVD-ROM, and the data reading unit of the computer includes a CD-ROM drive or a DVD-ROM drive.

* * * * *